2,823,128

STABILIZED AND BODIED ICE CREAM

Harry A. Toulmin, Jr., Dayton, Ohio, assignor to The Commonwealth Engineering Company of Ohio, Dayton, Ohio, a corporation of Ohio No Drawing. Application May 29, 1953
Serial No. 358,551

8 Claims. (Cl. 99—136)

This invention relates to milk products and to methods of making them. More particularly, the invention relates to frozen milk products such as ice cream and to improvements in the manufacture thereof.

In manufacturing ice cream, it is the practice to include in the composition a stabilizing and thickening agent which helps to impart a desirable body and smooth texture to the frozen product and to inhibit the growth of ice crystals therein during storage. To be entirely satisfactory, the stabilizer should be a substance which is fully effective as a bodying agent, maintains the smoothness of the product and substantially prevents the development of ice crystals over relatively long storage periods. Moreover, the stabilizer should be low in cost, convenient to handle and to incorporate into the ice cream mix, of a type which does not impart or develop a foreign or undesirable flavor and free from characteristics which interfere with or increase the cost of manufacturing the frozen product. It must also remain unaffected by the low temperatures at which the ice cream is normally maintained prior to consumption thereof.

None of the stabilizers which have been available for use in ice cream mixes possesses all of the desired properties. The natural gums which have been available do not have them and for that reason have been used in ice cream manufacture only on a small scale. The stabilizing value of gelatine, which has been widely used, has been found to depend on, or at least to be closely related to, the gel strength of its aqueous solution which makes standardization difficult. Gelatine has other drawbacks as a stabilizer and thickener for ice cream such as its effect in retarding whipping of the mix and the fact that, when gelatine is used, the mix must be cooled, and then aged from four to twenty-four hours, before it is frozen. It has also been observed that, often, gelatine causes ice cream with which it is mixed to develop an unpleasant "stale" flavor. Water-soluble alginates have been used but, in general the alginates possess properties which render them unsuitable for addition to the mix without prior blending with other substances. Thus, the water-soluble alginates are not compatible with the calcium salts present in milk and therefore, in the past, they have been introduced into the ice cream mix in conjunction with a water-soluble phosphoric acid salt for rendering the alginate compatible with the constituents of the mix. The alginates are not generally regarded as entirely satisfactory because they are not convenient to use and interfere with smooth progress of the mix through the steps of manufacture of the frozen product. Thus, a relatively high temperature is required to dissolve the alginates in the mix, the mix is viscous and tends to flow over the cooler very slowly, with a consequent reduction in the cooling rate, the alginates are susceptible to the action of salts occurring in varying amounts in milk from different sources, and at different times of the year, and are sometimes found to be incompatible with mixes having a developed acidity, so that neutralization of the mix prior to the addition of the alginate is required or at least advisable.

It is an object of this invention to provide new stabilized frozen milk products, such as ice cream, comprising stabilizing agents which are fully functional as bodying agents which impart a smooth texture to the frozen product and as regards prevention of crystallization therein, and which do not have the drawbacks of the known stabilizers.

Another object is to provide ice cream mixes comprising a new stabilizer and bodying agent and which flow rapidly in comparatively thin films over the cooler, do not require aging of the mix between cooling and freezing thereof, do not develop a stale flavor, and in which the stabilizer can be directly incorporated very conveniently by the mixing equipment conventionally used in preparing mixes of this type.

Another object is to provide a method for making the stabilized frozen milk products.

These and other objects are attained by the present invention in accordance with which ice cream mixes and the like are stabilized and bodied by incorporating therewith a water-soluble dextran.

The dextrans are high molecular weight, branched polysaccharides comprising anhydroglucopyranosidic units joined by molecular structural repeating linkages some, and apparently at least 50%, of which are alpha-1,6 linkages. The properties of the dextrans, including the extent of branching (the number and distribution of side groups or chains), the molecular weight, the molecular structural repeating alpha-1,6 to alpha-non-1,6 linkages ratios, and the water-sensitivity may vary.

The dextrans used in practicing the present invention are, preferably, water-soluble dextrans having a molecular weight between about 5,000 and $50 \times 10^6$, as determined by light scattering measurements.

These dextrans may be obtained in various ways. For example, they may be obtained by inoculating a nutrient medium containing sucrose, particular nitrogenous compounds and certain inorganic salts with an appropriate microorganism such as those of the Leuconostoc mesenteroides and L. dextranicum types, and incubating the culture at the temperature most favorable to the growth of the particular microorganism.

In one method of obtaining the dextran by a microbiological method, there is first prepared an aqueous nutrient medium which may have the following composition:

| | Percent by weight |
|---|---|
| Sucrose | 20.0 |
| Corn steep liquor | 2.0 |
| Monobasic potassium phosphate | 0.5 |
| Manganous sulfate | 0.002 |
| Sodium chloride | 0.50 |
| Water | Balance |

This medium is adjusted to a pH of between about 6.5 and about 7.5 preferably 7.2, and then sterilized. The material is cooled to room temperature and inoculated with a culture of the dextran-producing microorganism, for example with Leuconostoc mesenteroides B-512 (Northern Regional Research Laboratory classification) and incubated at 20° C. to 30° C. (optimum 25° C.) until a maximum yield of dextran has been attained; normally a period of between 12 and 48 hours will be satisfactory. The fermented product contains approximately 80–85% of water and is a thick turbid liquid.

The dextran is then precipitated from the fermentate. This may be accomplished in various ways to obtain a dextran suitable for this purpose and in pure condition that is substantially free from bacteria, bacterial decomposition products, enzyme and other contaminants which occur in the fermentate with it. One method of precipitating the dextran involves adding to the fermentate, at a pH between about 2.5 and 4.5, a lower aliphatic alcohol such as methyl, ethyl, isopropyl, etc. The precipitate thus obtained may be further purified by one or more reprecipitations with the alcohol. The dextran may then be dried, as for instance by drum drying and reduced to particulate condition, or it may be dried and obtained as a powder by spray-drying or by subjecting it to lyophilization.

The dextran thus produced is a so-called "native" dextran having a high molecular weight and which is soluble in water.

That dextran, or one having an equivalent molecular weight, may be used as stabilizer and bodying agent for the ice cream mix or the like, or as previously indicated water-soluble dextrans having a lower molecular weight may be used. The dextran having, initially, a high molecular weight, e. g., a molecular weight equivalent to that of the "native" B-512 dextran obtained as described above, may be hydrolyzed in any suitable manner, as by means of acid or enzymatically, to a product of lower molecular weight. The hydrolysis product may be fractionated to obtain a dextran of uniform or more nearly uniform molecular weight and the fraction may be purified by known methods for the removal of pyrogens and coloring materials. The dextran may be a so-called "clinical" dextran such as may be used as a blood plasma extender.

The dextran may be obtained by inoculating a culture medium with microorganisms other than that mentioned above. Thus, it may be a water-soluble dextran obtained by the use of the microorganisms bearing the following NRRL classifications: *Leuconostoc mesenteroides* B-119, B-1146, B-1190. Or it may be an initially water-insoluble or substantially water-insoluble dextran obtained by the use of *Leuconostoc mesenteroides* B-742, B-1191, B-1196, B-1208, B-1216, B-1120, B-1144, B-523; *Streptobacterium dextranicum* B-1254 and *Betabacterium vermiforme* B-1139, and which has been hydrolyzed to a stage at which it is soluble in water.

The dextran is not limited to one prepared under any particular set of conditions, including the microorganism used. It may be produced enzymatically, in the substantial absence of bacteria, by cultivating an appropriate microorganism, for example *Leuconostoc mesenteroides* B-512 to obtain a dextran-producing enzyme, separating the enzyme from the medium in which it is produced, and introducing the enzyme into a sucrose-containing medium in which dextran is produced by the action of the enzyme on the sucrose. Also, the dextran may be obtained by bacterial conversion of 1,4 linkages of dextrin to 1,6 linkages of dextran or in any other practical manner.

The amount of dextran incorporated with the ice cream mix may vary, but in general it is not used in an amount greater than about 0.5% of the weight of the mix. It may be less than that, and as low as 0.01% of the weight of the mix, if a dextran of high molecular weight is used. One of the factors which, for reasons of efficiency in making the ice cream, must be taken into account is the cooling rate for the mix. The mixes are usually prepared by heating the basic ingredients, to elevated temperature, adding the stabilizer and, after holding the mix for a short time of the order of 30 minutes or so, homogenizing the mix under pressure and then pouring it over a surface cooler, this cooling being followed by the final step of freezing. The rate at which the homogenized mix can be cooled depends on the fluidity or viscosity of the mix and the amount of dextran incorporated therein should be correlated with the molecular weight of the dextran and its effect on the viscosity of the mix to insure that the mix will flow smoothly over the surface of the cooler and can be cooled rapidly at relatively low temperatures and in a short period of time so that the work subsequently required in further cooling the mix to freezing temperature can be held to a minimum. In order to maintain a low viscosity for the mix and avoid overflowing of the cooler troughs and delays in the cooling process, it may be preferred to use a dextran of comparatively low molecular weight or to use very small amounts, around 0.01% to 0.2% of a dextran of higher molecular weight.

Mixes stabilized and bodied with the water-soluble dextran may be whipped and frozen after they are cooled and normally do not require intermediate aging between the cooling and freezing steps.

The following examples will illustrate specific embodiments of the invention.

*Example I*

A mix is prepared by heating 12% of butterfat, 10% of serum solids, and 15% of sugar to about 70° C. About 0.25% of powdered substantially pure "native" B-512 dextran is stirred into the mix, which is maintained at about 70° C. for about 30 minutes. The mix is then homogenized at 2500# pressure and poured over a surface cooler maintained at about 10° C. After cooling the mix is whipped and frozen in a counter type freezer to 100% overrun and hardened in the usual manner. Pint cartons are submitted to the usual heat shock and shrinkage tests. The stored samples do not show any substantial shrinkage or ice growth.

*Example II*

Example I is repeated except that 0.5% of particulate, hydrolyzed and purified dextran having an average molecular weight of about 75,000 is incorporated in the mix.

In the past, it has been the practice to introduce the stabilizer into the ice cream mix in admixture with a dispersing agent which, in the case of alginate stabilizers, at least, assisted solution of the stabilizer in the mix by dispersing and separating the particles thereof. Sugar, dextrine and milk powder have been used as the dispersing agents. Such agents may be added with the dextran, if desired, although they are not required. Agents which have a buffering action on the calcium ions of the milk may also be added with the dextran such as the alkali metal phosphates, e. g., trisodium phosphate, sodium-tetraphosphate, and sodium hexametaphosphate. The dispersing agents and buffering agents, if used, are employed in small amounts, the total combined amount thereof being not greater than 50% by weight of the composition consisting of those agents and the dextran, and preferably not greater than 25% by weight of that composition.

The dextrans are excellent stabilizers for the ice cream mixes and ideally adapted to that use, being edible materials which are bland, odorless, tasteless, non-toxic and non-irritating. The dextrans have practical advantages over such stabilizers as gelatine and the advantage as compared to alginic acid derivatives of being directly useful without requiring the production of water-soluble derivatives.

The dextran may also be used as stabilizers in other milk products, as for instance in chocolate milk to prevent settling of the cocoa or chocolate particles, and in processed cheese for imparting body thereto and preventing serum drainage from the finished product.

The base product stabilized according to the invention may be concentrated or dry whole milk solids which, after addition of the protective, stabilizing dextran may be canned for subsequent reconstitution by the addition of water to obtain a fluid milk having the taste of fresh milk. Or the concentrated milk having the dextran intimately associated with it may be frozen, subsequently thawed, and mixed with water to obtain a fresh-tasting, wholesome fluid milk.

In these last-mentioned embodiments, as will be understood, the amount of dextran may be varied.

It will be understood that while there have been described herein certain specific embodiments of this invention, it is not intended thereby to have it limited to or circumscribed by the specific details given, in view of the fact that this invention is susceptible of various modifications and changes which come within the spirit and scope of this disclosure and of the appended claims.

I claim:

1. An ice cream mix containing, as the stabilizing and bodying agent, 0.01% to 0.5% by weight of water-soluble NRRL dextran having a molecular weight between 5000 and that of native, microbiologically produced, unhydrolyzed water-soluble, NRRL dextran, determined by light scattering measurements.

2. An ice cream mix containing, as the stabilizing and bodying agent, 0.01% to 0.25% of native, unhydrolyzed, microbiologically produced, water-soluble NRRL dextran.

3. An ice cream mix containing, as the stabilizing and bodying agent, about 0.5% of a hydrolyzate of native water-soluble NRRL dextran, said hydrolyzate having an average molecular weight of about 75,000 determined by light scattering measurements.

4. An ice cream mix made from butter fat, serum solids and sugar, and containing as the stabilizing and bodying agent 0.01% to 0.5% by weight of native, unhydrolyzed microbiologically produced water-soluble NRRL dextran.

5. An ice cream mix made from butter fat, serum solids and sugar and containing as the stabilizing and bodying agent about 0.5% by weight of water-soluble NRRL dextran having an average molecular weight of about 75,000.

6. The method of making ice cream which comprises blending the essential ingredients including butter fat, sugar and serum solids at elevated temperature, mixing from 0.01% to 0.5% of water-soluble NRRL dextran having a molecular weight between 5000 and that of native, microbiologically produced, unhydrolyzed, water-soluble NRRL dextran, determined by light scattering measurements, with the blend, homogenizing the mixture under pressure and cooling and freezing the same.

7. The method of making ice cream which comprises blending the essential ingredients including butter fat, sugar and serum solids at elevated temperature, mixing from 0.01% to 0.25% of native, microbiologically produced, unhydrolyzed, water-soluble NRRL dextran with the blend, homogenizing the mixture under pressure and cooling and freezing the same.

8. The method of making ice cream which comprises blending the essential ingredients including butter fat, sugar and serum solids at elevated temperature, mixing about 0.5% of water-soluble NRRL dextran having an average molecular weight of about 75,000 determined by light scattering measurements with the blend, homogenizing the mixture under pressure and cooling and freezing the same.

References Cited in the file of this patent

UNITED STATES PATENTS

| Number | Name | Date |
|---|---|---|
| 2,089,217 | Mahoney | Dec. 29, 1934 |
| 2,267,911 | Grettie et al. | Dec. 30, 1941 |
| 2,409,816 | Wadsworth | Oct. 22, 1946 |
| 2,602,082 | Owen | July 1, 1952 |
| 2,609,368 | Gaver | Sept. 2, 1952 |

OTHER REFERENCES

Gould: The Ice Cream Trade Journal, April 1933, vol. 29, page 40.

"Bacterial Polysaccharides," by T. H. Evans and H. Hibbert, Scientific Report Series No. 6, Sugar Research Foundation, Inc., New York, April 1947, pages 216 to 201.

Pigman et al.: Advances in Carbohydrate Chemistry, vol. 4, New York, 1949, page 333.